(12) United States Patent
Al-Garni et al.

(10) Patent No.: US 7,771,568 B2
(45) Date of Patent: Aug. 10, 2010

(54) WIND-SOLAR DESALINATION FARM AND PARK SYSTEM

(75) Inventors: Ahmed Al-Garni, Dhahran (SA); Farooq Saeed, Dhahran (SA); Ayman Kassem, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 571 days.

(21) Appl. No.: 11/538,584

(22) Filed: Oct. 4, 2006

(65) Prior Publication Data
US 2008/0083604 A1    Apr. 10, 2008

(51) Int. Cl.
*B01D 3/42* (2006.01)
*C02F 1/04* (2006.01)
*C02F 1/14* (2006.01)

(52) U.S. Cl. .................. 202/176; 60/641.8; 60/641.9; 159/44; 159/903; 202/234; 201/1; 201/10; 201/22; 201/DIG. 1; 201/DIG. 17

(58) Field of Classification Search .............. 60/641.8, 60/641.9; 159/44, 903; 202/176, 234; 203/1, 203/10, 22, 27, DIG. 1, DIG. 8, DIG. 17
See application file for complete search history.

(56) References Cited

U.S. PATENT DOCUMENTS

| | | | | | |
|---|---|---|---|---|---|
| 4,135,985 | A | * | 1/1979 | La Rocca | 202/176 |
| 4,363,703 | A | * | 12/1982 | ElDifrawi et al. | 203/10 |
| 4,504,362 | A | * | 3/1985 | Kruse | 203/3 |
| 4,883,823 | A | * | 11/1989 | Perry, Jr. et al. | 518/702 |
| 5,628,879 | A | * | 5/1997 | Woodruff | 202/234 |
| 5,645,693 | A | * | 7/1997 | Gode | 202/173 |
| 6,165,326 | A | * | 12/2000 | Markopulos | 202/234 |
| 6,797,124 | B2 | * | 9/2004 | Ludwig | 202/234 |
| 2007/0245730 | A1 | * | 10/2007 | Mok | 60/641.8 |
| 2008/0078670 | A1 | * | 4/2008 | Al-Garni et al. | 202/234 |

FOREIGN PATENT DOCUMENTS

DE        3501396     * 7/1986

* cited by examiner

*Primary Examiner*—Virginia Manoharan
(74) *Attorney, Agent, or Firm*—Lowe Hauptman Ham & Berner, LLP (57) ABSTRACT

A self sustaining desalination system includes a chamber having a transparent inclined cover and a transparent bottom for receiving seawater or the like. The system includes a channel for conveying seawater to the chamber and a receptacle for receiving distillate at the base of the cover. The seawater is vaporized by solar energy passing through the incline cover and reflected up through the transparent bottom. A portion of the vaporized water condenses on the cooled inside cover and runs down into the receptacle. A second portion of the vaporized water is fed to the heat exchanger and condensed therein. In addition, a plurality of such systems are combined with a plurality of basic units each of which includes a wind turbine and an array of solar panels in a park like setting to provide electricity, drinking water and irrigation water for a small community.

5 Claims, 8 Drawing Sheets

WIND-SOLAR DESALINATION FARM AND PARK SYSTEM

FIELD OF THE INVENTION

The present invention relates to a wind and solar powered desalination system and more particularly to a self-sustaining wind and solar powered desalination system for producing electricity, drinking water and water for irrigation. The invention also relates to an environmentally friendly self-sustaining wind/solar desalination farm and park for providing electricity, drinking water, water for irrigation and the recreational needs for a small community located near a body of saline water.

BACKGROUND FOR THE INVENTION

The use of wind energy for generating electricity and solar energy for desalination and combinations thereof are well known. For example a U.S. Pat. No. 4,504,362 of Kruse discloses a solar desalination system and method. As disclosed therein, a system produces fresh water from seawater by focusing solar ray energy from a collecting reflector onto an evaporated tube located at substantially the focal apex of the reflector. The reflector/evaporator tube assembly is mounted on a horizontal open grid platform which may support a plurality of parallel reflectors/evaporator tube assemblies. The reflectors may serve as pontoons to support the desalination system unit on a body of seawater. The solar heat generated vapor is condensed in condenser tubes immersed in the seawater. Intermittently seawater concentrate is withdrawn from the evaporator tubes. Velocity of a vapor passing from the evaporator tubes to the condensers may be utilized for generating power.

A more recent patent of Perry Jr. et al. U.S. Pat. No. 4,883,823 discloses a self-contained renewable energy system. As disclosed therein, an integrated power system is located adjacent a body of saline water. The power system includes a solar powered and a wind driven engine. Desalination and electrolysis of the water is provided. The system produces carbon dioxide and hydrogen which are used to generate methanol. The methanol can be used as a fuel to drive a combustion engine.

In addition to the above, a U.S. Patent Application Publication No. U.S. 2005/0067271A1 of Ciudaj discloses a processing structure for super accelerating nature, producing a continuous supply of fresh water from salt water by using solar, wind and wave energy. The Ciudaj Publication discloses a continuous supply of fresh water achieved through desalination by a system of Venturi shafts to increase the velocity and pressure of air flow allowing for increased condensation and processing of evaporated water to a structure that incorporates a "black" evaporation surface, concave Venturi wind walls, a vertical Vernturi wind shaft, condensation chambers connected by horizontally stacked hollow cylinders, heat transfer duct that draws cool air from a water body, vents hot air through an air exhaust port and a water drainage port that flows water to a reservoir.

Notwithstanding the above, it is presently believed that there is a need and a commercial market for an improved solar desalination system in accordance with the present invention. There should be a market for such systems that use a combination of wind, solar energy and water vapor power to provide increased efficiencies and effectiveness in an environmentally friendly manner. Such systems can also provide fresh water in areas where there is a shortage of potable water and do so without using petroleum products which can reduce the consumption of such products and a dependence on costly oil. Therefore, it is believed that the cost for such potable water may be reduced.

As contemplated by the present invention, a plurality of wind and solar powered desalination units are combined in a park like setting to provide an environmentally friendly self-sustaining wind-solar-desalination farm and park system for providing electricity, drinking water and irrigation water for a small community near a body of saline water.

BRIEF SUMMARY OF THE INVENTION

In essence the present invention contemplates an improved solar desalination system that includes a chamber having a transparent inclined cover and a transparent bottom for receiving a mass of saline water. The system also includes means including a channel for conveying a mass of relatively cold seawater to the chamber and a receptacle for receiving distilled water disposed at a base or bottom of the inclined cover. The receptacle is adapted to receive condensed water that flows down the inside of the inclined cover. A heat exchanger such as a tubular conduit is disposed in the channel below the level of the relatively cold seawater. Means for heating seawater in the chamber includes positioning the chamber to receive solar energy through the inclined transparent cover and means for reflecting solar energy through the transparent bottom of the chamber to evaporate water in the chamber. The heating of the water in the chamber vaporizes water which is then condensed on the inner surface of the inclined cover. The condensed water runs down the inclined surface and into the receptacle for pure water. The system also includes means for directing a portion of the water vapor into the heat exchanger which condenses the vapor and adds the condensed water to that in or from the receptacle.

A preferred embodiment of the invention contemplates a wind-solar-desalination system for producing electricity and potable water. The system includes a plurality of basic units that each includes a wind turbine and an array of solar panels for generating electricity. The system also includes a plurality of solar wind powered fan cooled desalination subsystems. Such subsystems include a heat exchanger, a distillation portion with an inclined cover and means for heating a mass of seawater to produce water vapor. The system also includes means for dividing the water vapor so that a portion is condensed on the inner surface of the inclined cover and a second portion is diverted into the heat exchanger. The inclined cover is cooled preferably by a solar and/or wind powered fan so that a portion of the water vapor is condensed on the inclined cover and flows down the inclined cover and into a receptacle for distilled water. The vaporized water diverted into the heat exchanger is condensed therein to provide additional distillate.

The invention will now be described in connection with the accompanying drawings wherein like reference numerals have been used to identify like parts.

DESCRIPTION OF THE PREFERRED EMBODIMENTS OF THE INVENTION

A novel wind-solar-desalination farm and park system in accordance with the present invention as well as a basic unit for generating electricity and producing drinking water and water for irrigation will now be described. The system is designed to be environmentally friendly as well as self-sufficient and self-sustaining in supporting the electricity, fresh drinking water and water for irrigation and recreational needs for a small community as for example five hundred homes. The system is located near the sea or more specifically near a source of saline water.

Referring now to FIGS. 1-4, a first embodiment of the invention includes a basic unit 20 as laid out for the Northern Hemisphere i.e. facing the prevailing winds from the Northeast. The basic unit 20 includes a wind turbine 22 and an array of solar panels 24 for generating electricity. The wind turbine 22 may be of any conventional design such as those used on wind farms in various parts of the United States. For example, a wind farm including about one hundred and thirty wind turbines have been proposed for Nantucket Sound. The wind turbines are proposed for an area of relatively shallow water toward the center of Nantucket Sound in a grid pattern. In that case, the towers will be two hundred forty seven feet from the surface of the water to the center of the blades while the tips of the blades will be about seventy five feet above the surface of the water. Such turbines are expected to produce an average of one hundred seventy megawatts which is about seventy five percent of the demand for Cape Cod and the islands of Martha's Vineyard and Nantucket.

Figure 1:
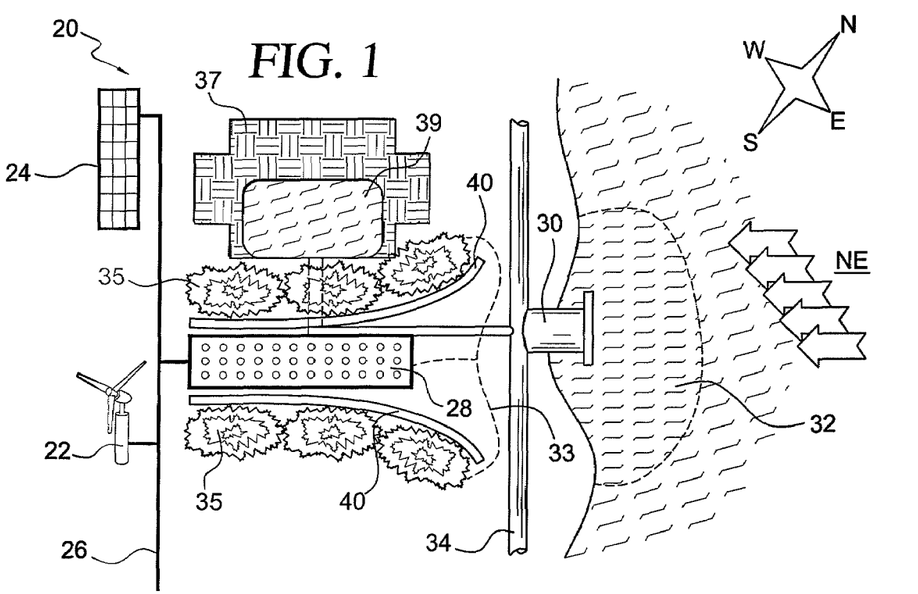
FIG. 1 is a top or plan view illustrating an overall layout for a self-sustaining wind-solar-desalination farm and park system in accordance with one embodiment of the invention.

The array of solar panels 24 is also of conventional design and sized in accordance with known engineering principals. In the present application, the output for the wind turbines 22 and array of solar panels 24 is fed to an electrical grid 26 and used for the desalination system and local community. As shown in FIG. 1, an array of desalination units 28 is adapted to receive electric power from the grid 26.

An electric pump 30 powered by the grid 26 pumps water from the source 32 of seawater to the array of desalination units 28 and also along a water channel 34 for delivering additional water to the desalination units (not shown in FIG. 1). Water for irrigation is taken from the desalination units 28 by an underground irrigation system 33 and used to water or irrigate the trees 35 and other plants in a park like setting and/or farm 37. In addition, the park like setting may include a seawater pond 39 for fish and other marine life.

As illustrated the trees 35 or other plants may be used to hide a converging channel 40 which may be of concrete or other suitable structure for increasing the speed of the wind as it passes over the array of desalination units 28. It is presently estimated that the prevailing winds along the coast will be between 11 and 13 mph and the speed will be increased as the mass of air passes through the converging channel 40 to improve the cooling of an inclined cover (not shown in FIG. 1).

Figure 2:
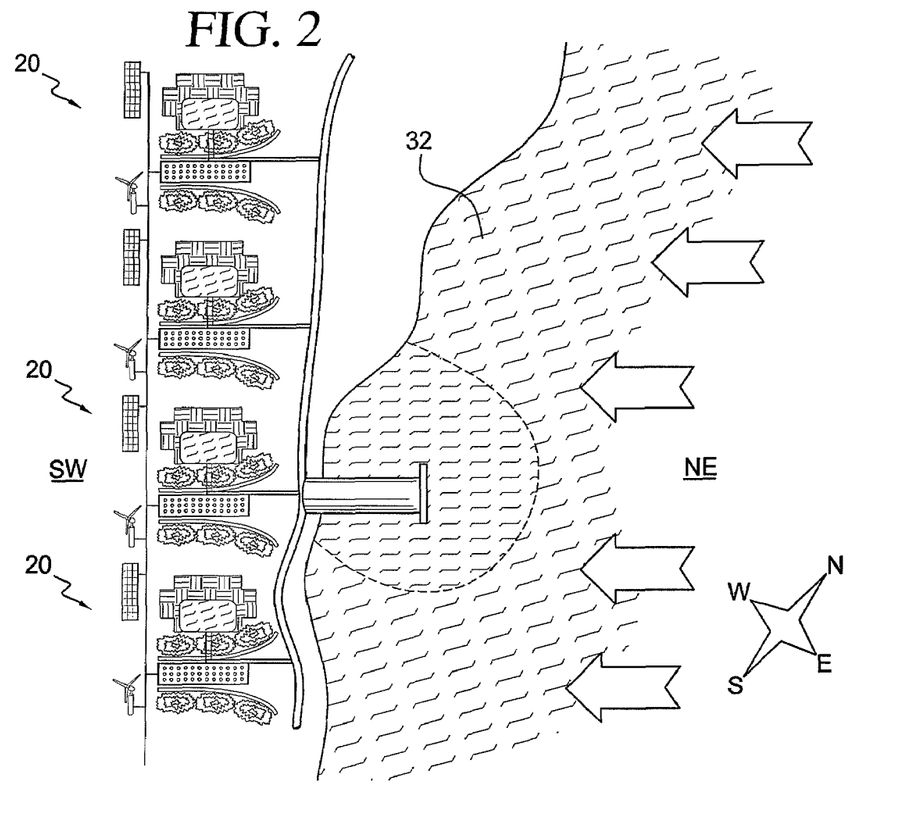
FIG. 2 is a top or plan view illustrating an overall layout for a plurality of self-sustaining wind-solar-desalination units for a farm and park system in accordance with the first embodiment of the invention as positioned for the Northern Hemisphere.
Figure 3:
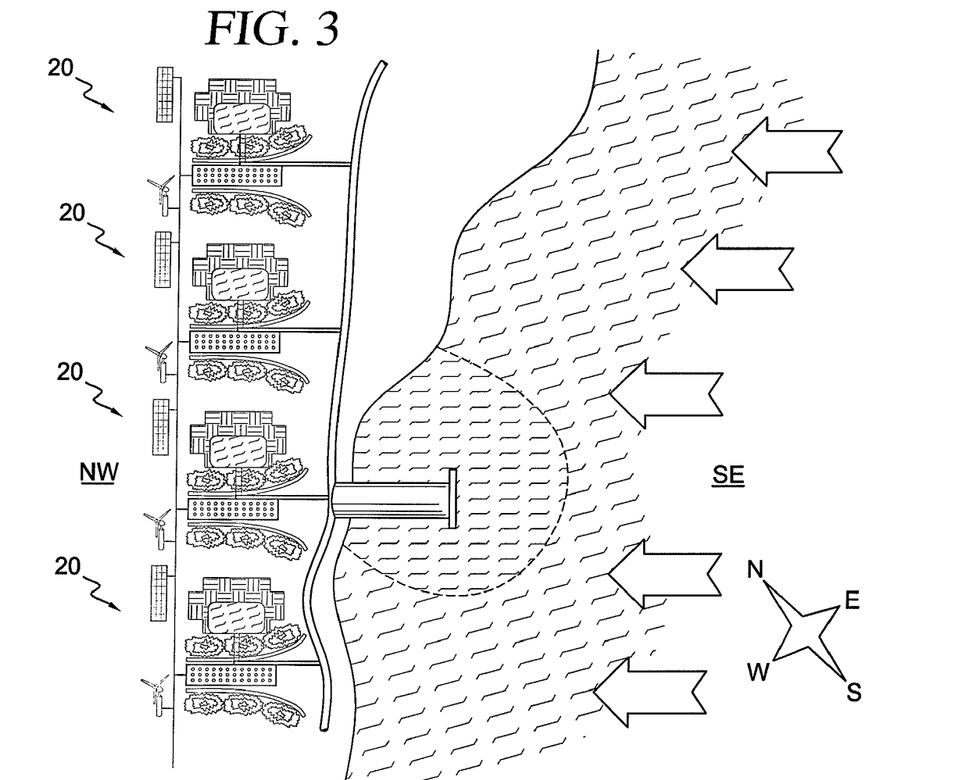
FIG. 3 is a top or plan view of a typical farm or park system as shown in FIG. 2 but with it's position modified for the Southern Hemisphere.

FIGS. 2 and 3 illustrate a plurality of basic units 20 deployed along a coast with FIG. 2 showing the deployment in the Northern Hemisphere and FIG. 3 showing deployment in the Southern Hemisphere. In both cases, a plurality of units 20 are positioned to take advantage of the prevailing winds. For example, the prevailing winds in the Northern Hemisphere are from the Northeast. In the Southern Hemisphere the prevailing winds are from the Southeast and toward the Northwest.

Figure 4:
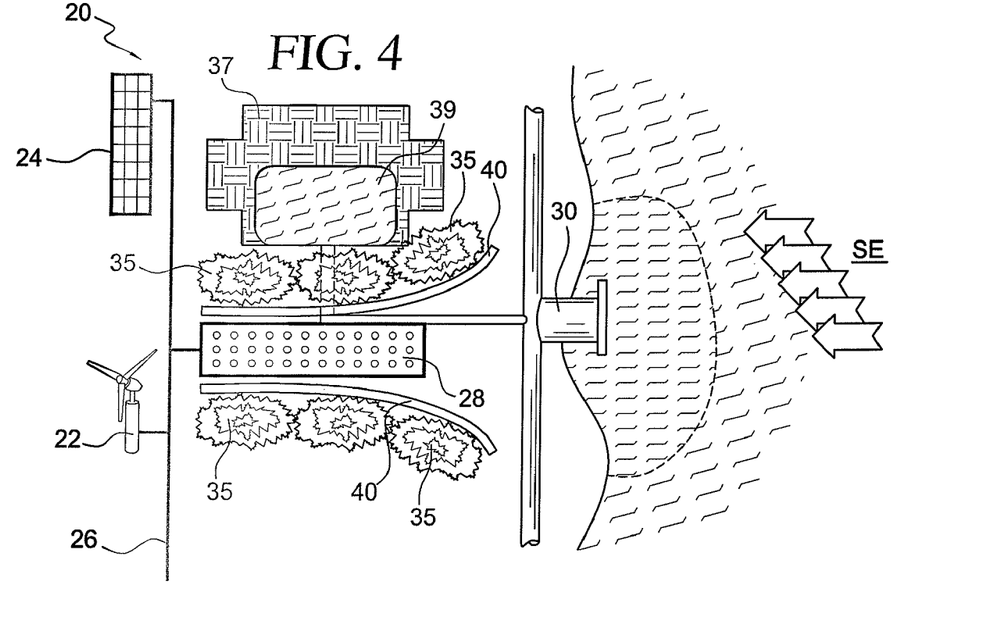
FIG. 4 is a top or plan view illustrating a self-sustaining wind-solar-desalination system with a convergent structure to increase wind speeds above the desalination system.

The converging channel 40 shown more clearly in FIGS. 1 and 4 is positioned to face the prevailing wind and comprises a fixed structure for increasing the speed of the wind across the desalination units 28. For example, a converging channel is defined by two curved concrete walls which may be hidden by the trees 35.

Figures 5, 6:
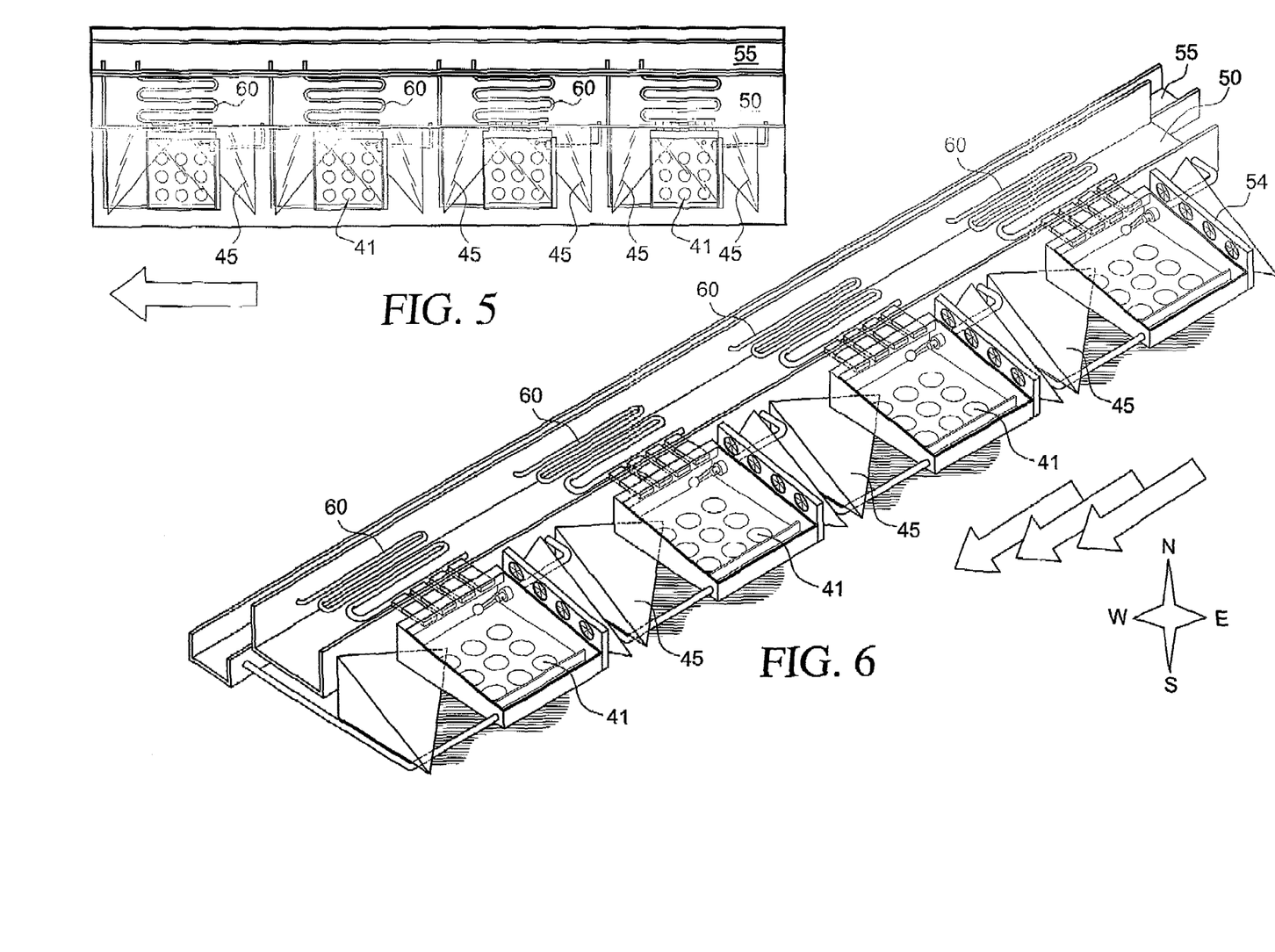
FIG. 5 is a top or plan view illustrating an array of desalination units in accordance with the present invention.
FIG. 6 is perspective view of an array of desalination units in accordance with the present invention in the Northern Hemisphere as viewed from the South.
Figures 7, 8:
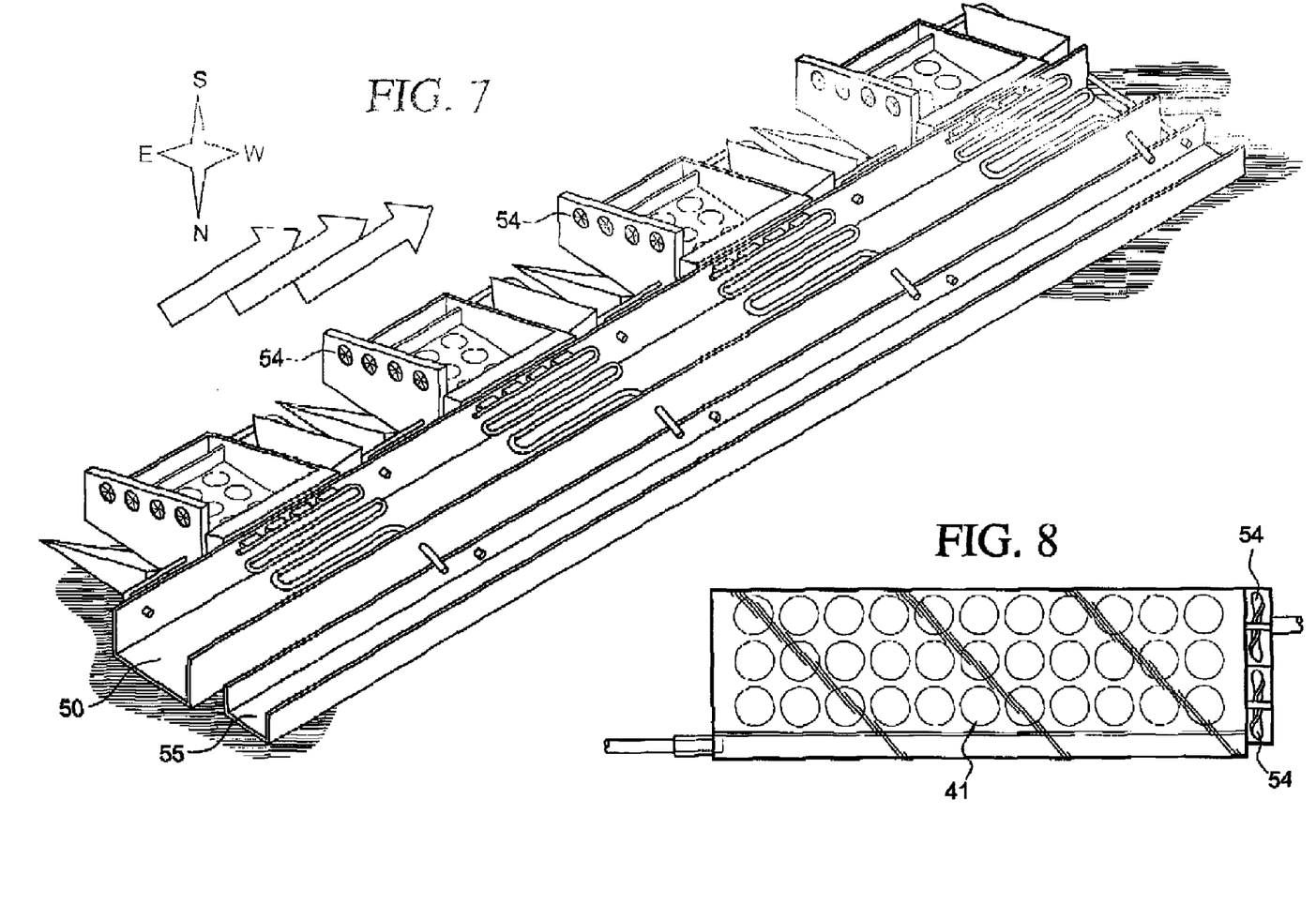
FIG. 7 is a perspective view of a plurality of desalination units in the Northern Hemisphere as viewed from the North.
FIG. 8 is top view of a portion of a desalination unit in accordance with the present invention.
Figure 10:
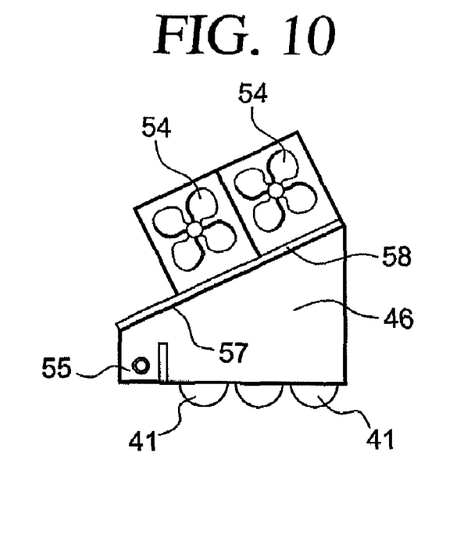
FIG. 10 is a side view of a portion of a desalination unit in accordance with the present invention that includes a pair of fans to cool the top of the transparent cover.
Figure 11:
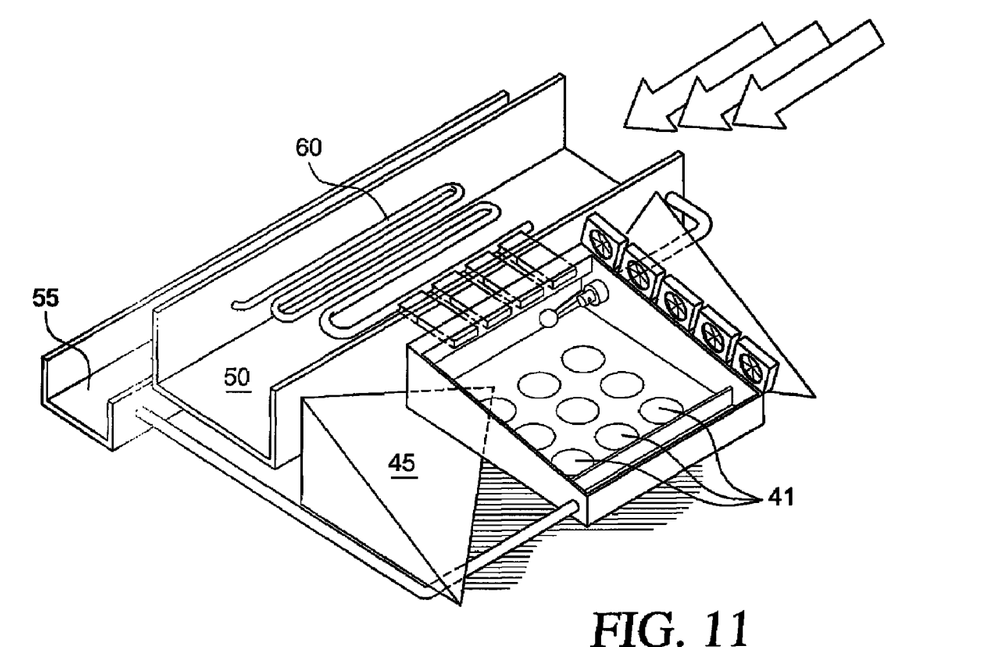
FIG. 11 is a perspective view of a desalination unit in accordance with another embodiment of the invention in the Northern Hemisphere as viewed from the South.

The plurality of desalination units 28 are also shown in FIGS. 5-7 wherein each of the four units shown includes a plurality of convex lenses 41 in a bottom of the unit. A significant feature of the unit 28 relates to two proposed pyramid shaped solar reflectors 45; one on each side and below the desalination trough 47 or the solar still 46. The solar reflectors reflect solar energy up through the lenses 41 which focus the solar energy at or near the surface of the seawater to vaporize the seawater. As shown in FIGS. 5-7, channel means 50 such as a trough directs sea or brackish water from the pump 30 to a still portion 51 for distillation. The seawater is then vaporized by solar energy reflected through the lens 41 and passing through an incline cover 53 (see FIG. 10).

Figure 9:
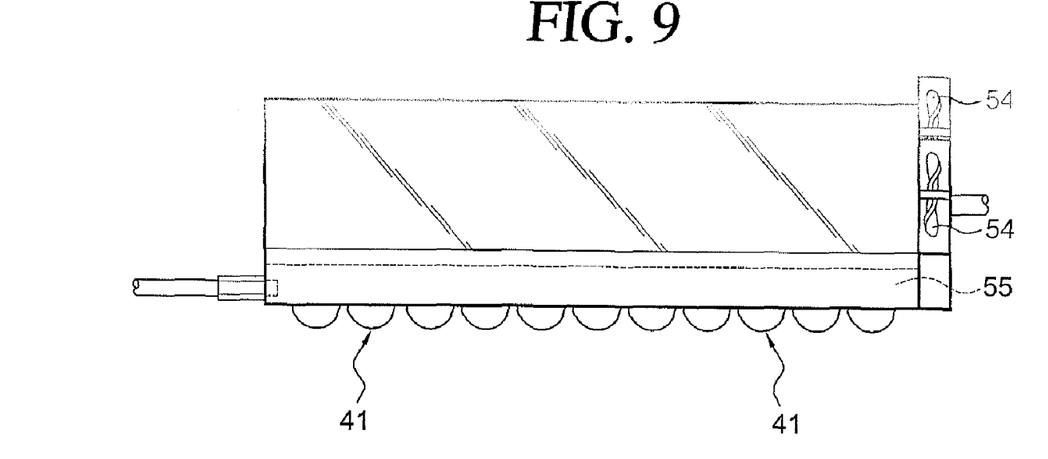
FIG. 9 is a front view illustrating a portion of a desalination unit in accordance with the present invention.

As shown in FIGS. 6 and 7 an array of desalination units 28 is arranged adjacent to two parallel channels. For example, the channel 50 carries seawater to the distillation units while the channel shaped receptacle 55 receives distilled or fresh water from the distillation portion of the unit 28 and from the heat exchanger 60 that are disposed in the channel below the level of the relatively cold seawater. A plurality of solar-wind powered fans 54 (see FIGS. 7, 9 and 10) are constructed and arranged to cool an inclined transparent cover 53 to aid in condensing vaporized water on the inside surface 57 of the cover 53 so that is flows down the cover 53 and into the channel shaped receptacle 55. As shown more clearly in FIG. 8, the portion of the bottom of the desalination chamber between the lenses 41 serves as a black-body for absorbing heat and aids in the vaporization of the seawater in the chamber i.e. within the distillation portion of the distillation unit.

In order to enhance the heat transfer for the condensation process in the distillation units, the top glass surface or inclined cover of the desalination units is cooled from the outside. To accomplish this, the desalination units are positioned to take advantage of the prevailing winds and then make use of a converging channel that can speed up the flow within as it passage is narrowed. Thus, the use of the convergent passage can be made to boost the wind speed above the desalination units. The convergent passage can be formed with a specific arrangement of trees or by erecting a concrete structure in the form of a convergent channel or any other similar form. In a preferred embodiment of the invention a concrete structure is used and generally hidden from view by trees or other plants.

FIG. 8 illustrates a desalination unit according to the present invention from above. The base of the desalination unit i.e. the bottom of a chamber is composed of an array of convex lenses in various sizes or configurations embedded in a black-body that readily absorbs heat from the sun. An array of solar powered blower fans also cools the top glass surface to enhance condensation inside the still.

FIG. 11-15 illustrates several significant features of the solar-wind-powered fan-cooled seawater desalination unit that includes a combination of two pyramid shaped solar reflectors 45 one on each side and below the desalination trough or the solar still, multiple convex lenses 41 in various shaped sizes and configurations at the base of the desalination or still portion of the unit. A water level regulator 70, an open or a water vapor pressure operated valve 65, a temperature sensor 74, a heat exchange unit for condensation of water vapor and the associated piping and a plurality of solar-wind-powered fans 54. The system is designed to distill water from two sources namely condensation of water vapor in the still and condensation of water vapor in the heat exchanger. The desalination units are placed above the pyramid shaped reflector to allow sunlight to be reflected from the reflectors onto the convex lenses embedded in the base of the desalination units. A system of pipes feeds seawater from the seawater channel to the desalination unit and takes fresh water from the fresh water trough channel inside the desalination unit to the fresh water channel.

Figure 12:
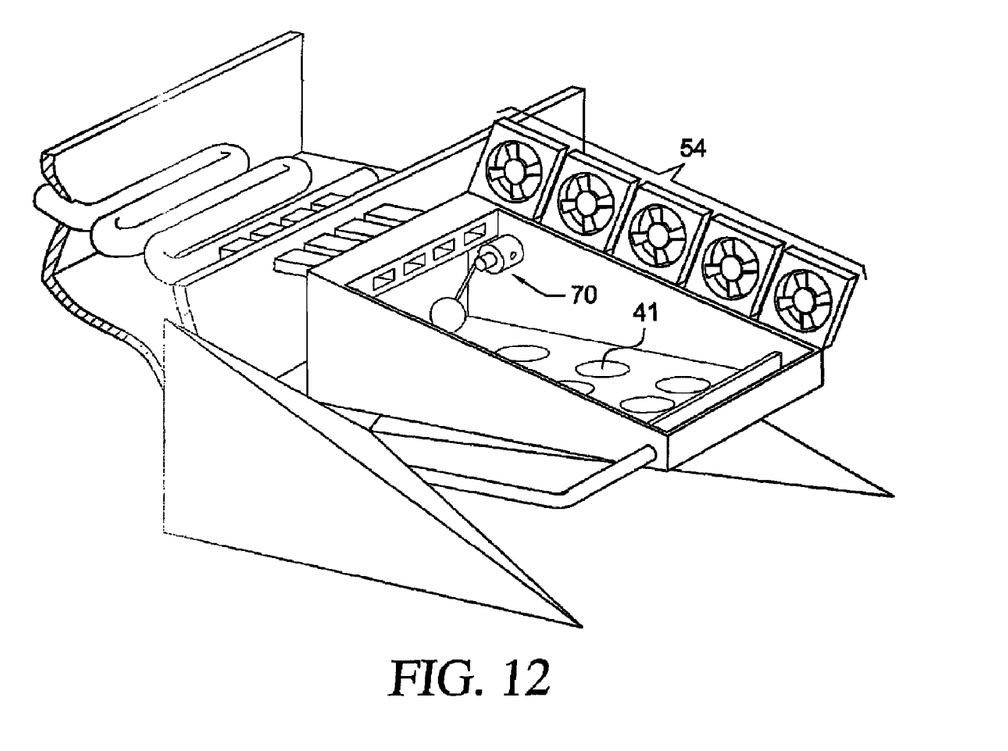
FIG. 12 is a perspective view of a portion of a desalination unit in accordance with the present invention and the use of a float valve to regulate the water level in the still.
Figure 13:
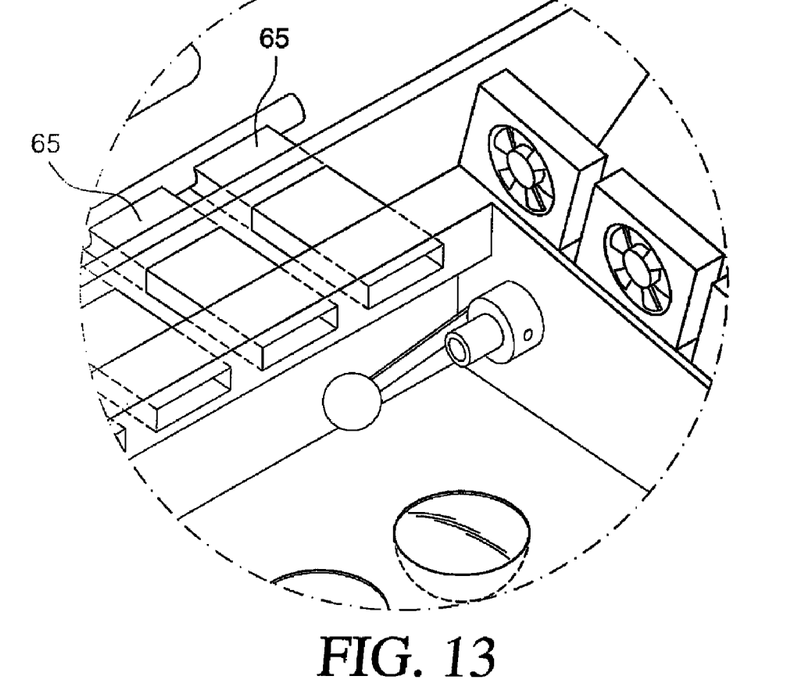
FIG. 13 is a perspective view of a portion of a desalination unit showing the exhaust ports for directing a portion of the water vapor to a heat exchanger and a float valve assembly for regulating the level of saline water in the unit.
Figure 14:
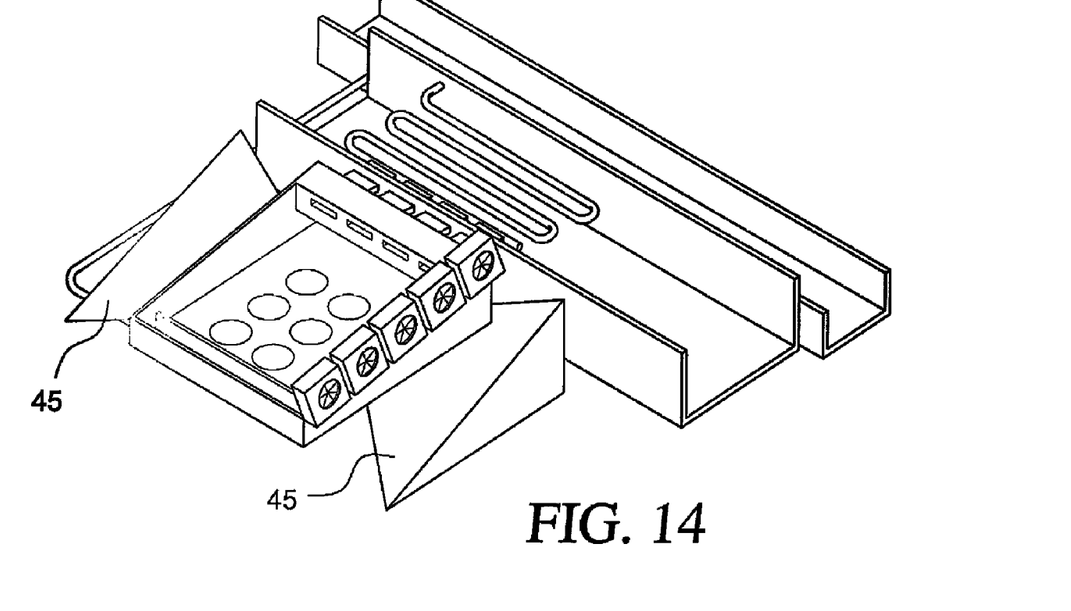
FIG. 14 is a perspective view of a portion of a desalination unit illustrating different components of the present invention.
Figure 15:
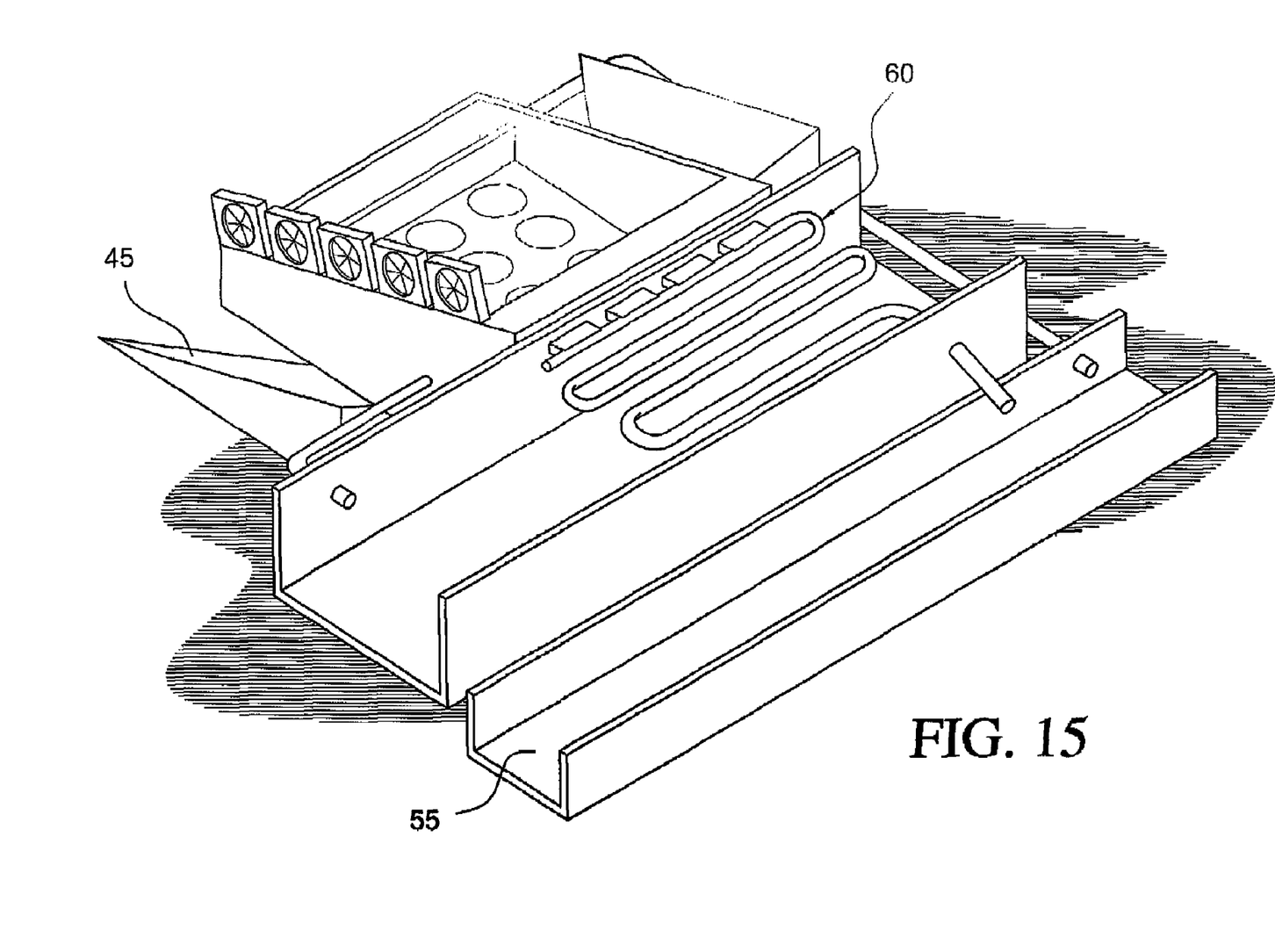
FIG. 15 is perspective view of a portion of a desalination unit illustrating the components shown in FIG. 14 but taken in a different direction.

As illustrated in FIG. 12 a float ball and cork type water level regulator are used to maintain the level in the still. Further, the exhaust ports for the water vapors leading to the heat exchanger are shown in FIG. 13-15.

While the invention has been described in connection with its preferred embodiments, it should be recognized that changes and modifications may be made therein without departing from the scope of the appended claims.

What is claimed is:

1. A self-sustaining wind and solar-powered desalination system for producing electricity, potable water and water for irrigation comprising:
   a plurality of desalination units each of which includes a wind turbine and an array of solar panels for generating electricity;
   a plurality of solar and wind powered fan cooled desalination systems each of which has a heat exchanger and a distillation portion for solar heating of saline water to thereby produce a mass of water vapor;
   means dividing a portion of said water vapor into said distillation portion and a portion of said water vapor into said heat exchanger;
   each distillation portion in a plurality of desalination units includes: a chamber having a transparent inclined cover and a transparent bottom for receiving the saline water;
   a receptacle for receiving distilled water disposed at a base of said inclined cover and channel means including a channel for conveying said saline water to said chamber and said heat exchanger disposed in said channel below the level of the saline water;
   means for heating the saline water in said chamber by positioning said chamber to receive solar energy through said transparent inclined cover and means for reflecting solar energy through said transparent bottom to evaporate the saline water to thereby produce said water vapor;
   means including said inclined transparent cover for condensing the vapor and causing distilled water to flow down said inclined transparent cover and into said receptacle;
   means for directing a portion of the vaporized water into said heat exchanger to thereby condense the vaporized water and means for adding the condensed water from said heat exchanger to said distilled water in or from said receptacle;
   a restricted wind channel for increasing the speed of wind from the turbine across said inclined cover; and
   an irrigation system wherein water from the desalination units is used to irrigate trees and plants in a farm and park system.

2. A wind-solar-desalination system according to claim 1 which includes a heat absorbing body for raising the temperature of saline water in said chamber.

3. A wind-solar-desalination system according to claim 2 which includes a plurality of lenses for focusing solar energy on the surface of the saline water.

4. A wind-solar-desalination system according to claim 3 which includes an electric pump for pumping saline water into said chamber.

5. A wind-solar-desalination system according to claim 4 which includes means for maintaining the saline water in said chamber at a pre-selected level.

* * * * *